United States Patent [19]
Kondo et al.

[11] Patent Number: 4,993,022
[45] Date of Patent: Feb. 12, 1991

[54] SYSTEM FOR AND METHOD OF MULTIPLEXING SPEECH SIGNALS UTILIZING PRIORITY SIGNALS FOR INDIVIDUAL TRANSMISSION CHANNELS

[75] Inventors: Kazuhiro Kondo, Fuchu; Toshiro Suzuki, Tama, both of Japan

[73] Assignee: Hitachi, Ltd., Tokyo, Japan

[21] Appl. No.: 307,605

[22] Filed: Feb. 7, 1989

[30] Foreign Application Priority Data

Feb. 12, 1988 [JP] Japan .................................. 63-30160

[51] Int. Cl.⁵ .............................................. H04L 5/22
[52] U.S. Cl. ..................................... 370/79; 370/85.6
[58] Field of Search ..................... 370/79, 80, 81, 85.6

[56] References Cited

U.S. PATENT DOCUMENTS

| | | | |
|---|---|---|---|
| 4,095,052 | 6/1978 | Ching et al. | 370/81 |
| 4,397,019 | 8/1983 | Alvarez et al. | 370/79 |
| 4,550,399 | 10/1985 | Caron | 370/80 |

FOREIGN PATENT DOCUMENTS 0077439 4/1986 Japan .

OTHER PUBLICATIONS

S. J. Campanella, "Digital Speech Interpolation", Comsat Tech. Review, vol. 6, No. 1, 1976, pp. 127–158.
Yukinao Hashitsume et al., "V-PADLIC the Voice Subscriber Line Interface Circuit Applied for Packetized Multi-Media Switching System", SE 87–69, 1987, pp. 25–30.

Primary Examiner—Douglas W. Olms
Assistant Examiner—Melvin Marcelo
Attorney, Agent, or Firm—Fay, Sharpe, Beall, Fagan, Minnich & McKee

[57] ABSTRACT

A system for and a method of multiplexing digital speech signals corresponding to speech signals inputted from a plurality of terminals, the digital speech signals including a plurality of speech unit signals, in which a weighted priority signal is produced for the speech unit signal of each of the speech signals from the terminals, an assignement signal is produced from the priority signals indicative of which of the speech unit signals be selected for transmission in the form of a train of multiplexed speech unit signals in a cyclic transmission period of time, so that the speech unit signals are multiplexed on the basis of the assignment signal.

11 Claims, 16 Drawing Sheets

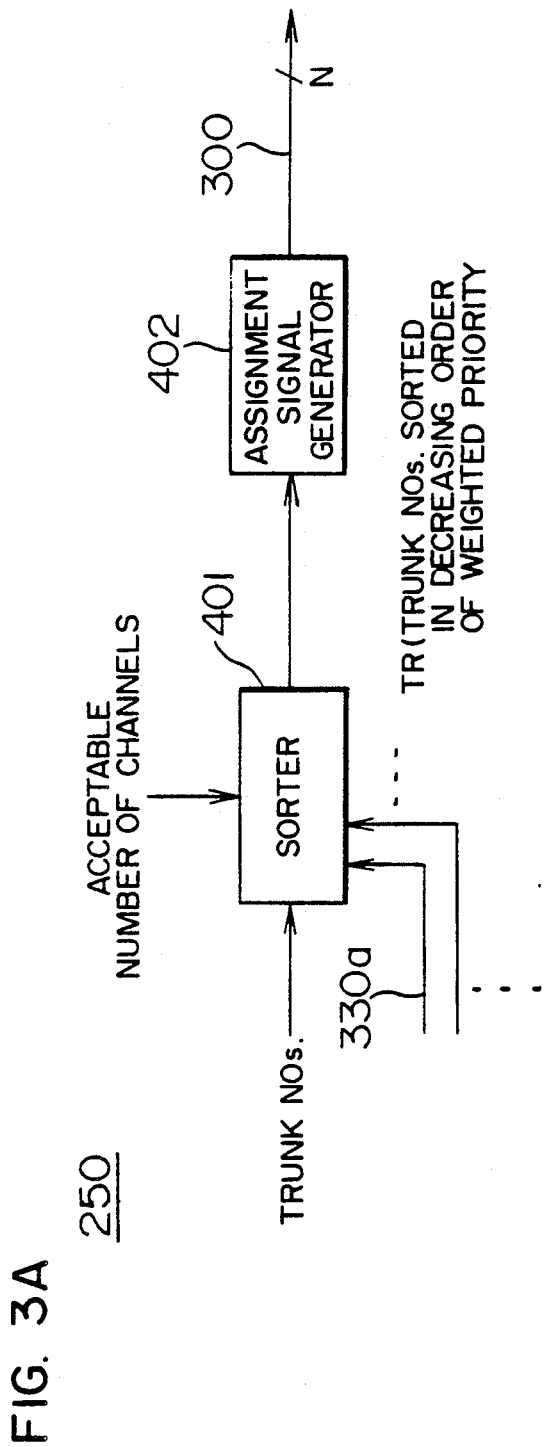

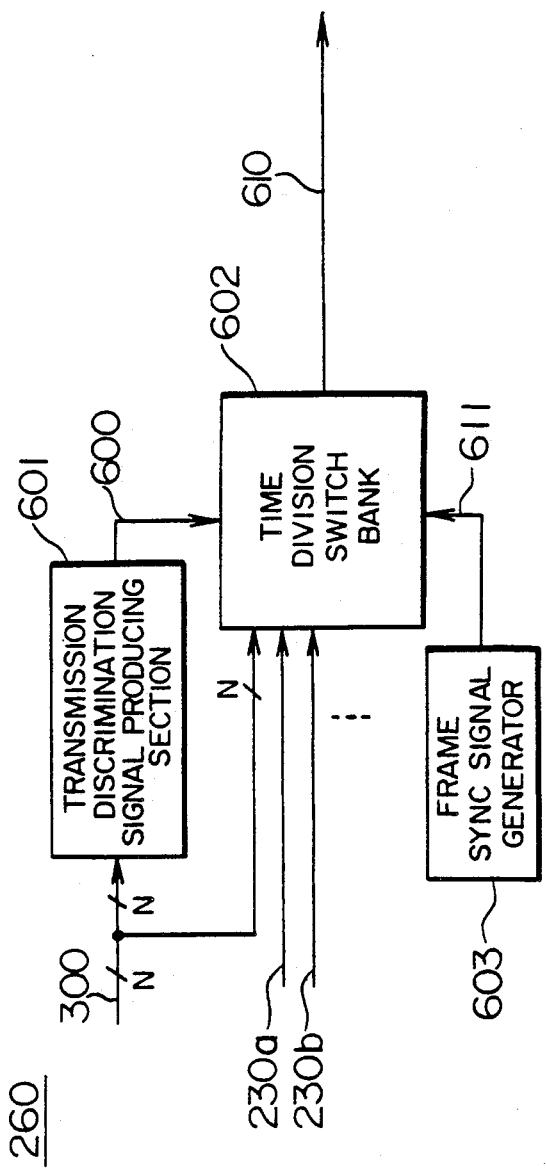

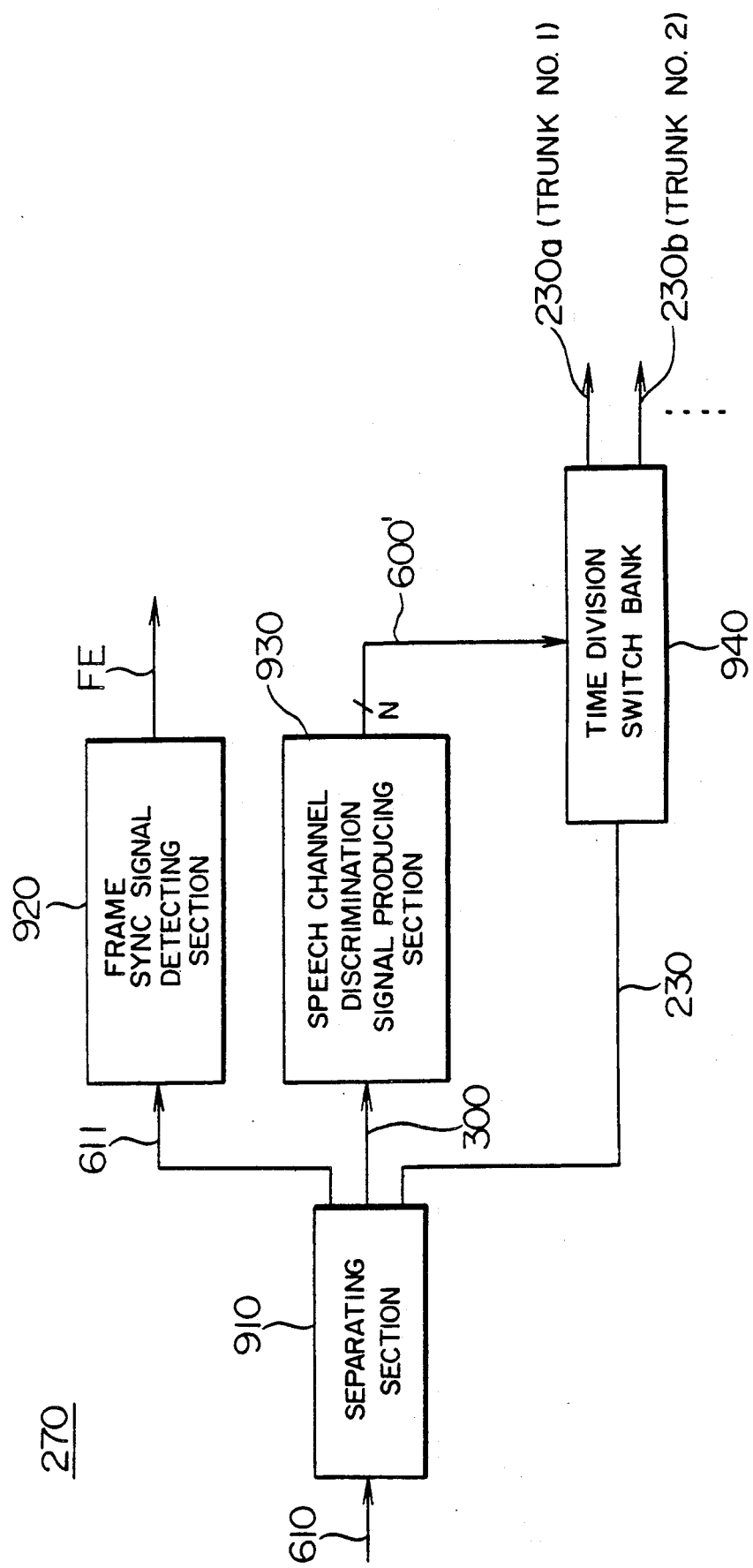

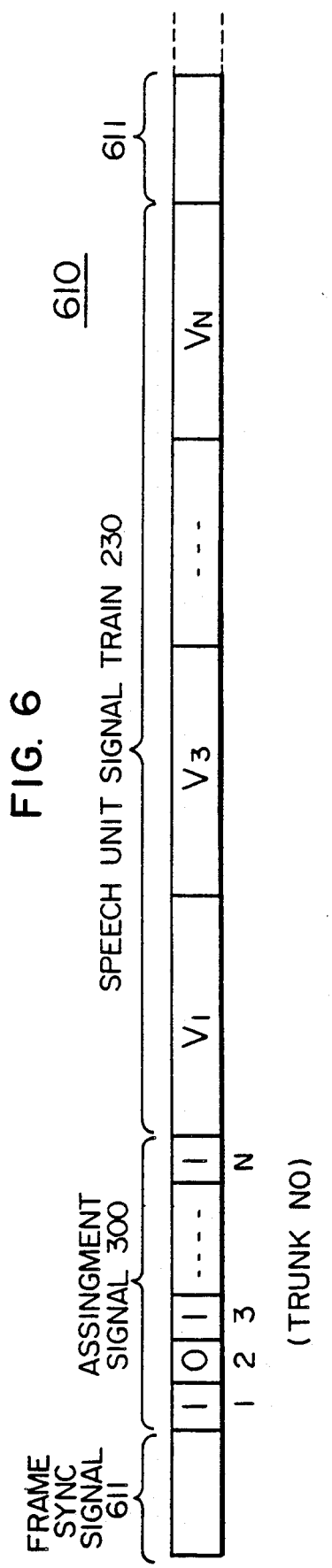

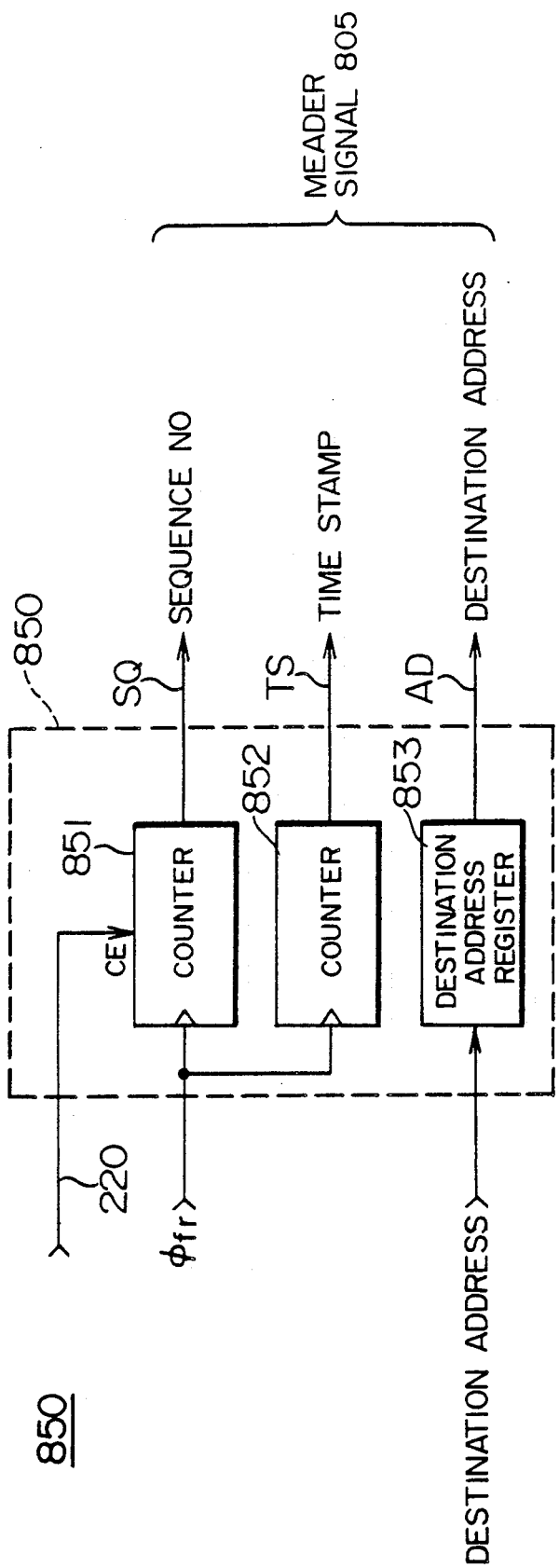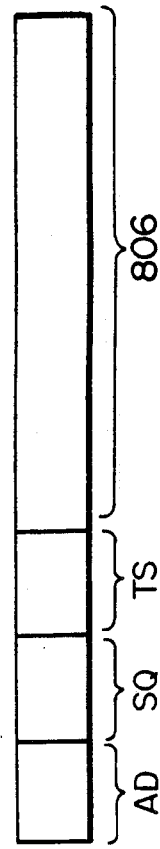
FIG. 9
850
FIG. 10
840

SYSTEM FOR AND METHOD OF MULTIPLEXING SPEECH SIGNALS UTILIZING PRIORITY SIGNALS FOR INDIVIDUAL TRANSMISSION CHANNELS

BACKGROUND OF THE INVENTION

This invention relates to a system for and a method of multiplexing speech signals and in particular to a digital speech interpolation (DSI) technique for multiplexing speech signals with a high efficiency and to a system for and a method of multiplexing speech signals in which control of the amount of speech information to be multiplexed is possible.

An effective speech signal multiplexing system has been proposed in which many terminals are connected with transmission channels, the number of the terminals being greater than that of the channels. In such a system, when communication requests are made simultaneously from a number of terminals, which is greater than the number of channels stated above, communication above the capacity of the channels is made possible by using the channels in time division fashion while intercepting appropriately speech frames having small influences on the quality of speech sound. As an example of this kind of a system, a multiplexing system is disclosed in JP-A-61-77439 (laid-open on Apr. 21, 1986) in which, exclusion or "freeze-out" in particular channels has been controlled by regulating the discrimination level and the hangover time of the speech detector, using past statistical data. Here the principal item of the past statistical data is the past rate of freeze-out of speech in the particular channels. The other channels have no influence on the statistical data and many other items of the statistical data are not used. Further, in the case where the number of communication requests is greater than the number of channels, the amount of speech information judged to be talk-spurt is reduced by raising the discrimination level of the speech detector so that speech information lower than the raised level is judged not to be speech. Furthermore, for the hangover time, i.e. time sections such as at the termination of words or in intervals between words where the speech information level is low, if the level of the detector is set high, since the information during such time sections are cut or neglected, they have influences on the speech sound quality. However, it is possible to deal with them as speech and to reduce the number of cuts by adding superfluous time thereto. Consequently, the amount of information judged to be talk-spurt can be controlled by regulating the hangover time added to the termination or the interval.

In this way, according to the prior art techniques the amount of the speech information is reduced by regulating the detection level and the hangover time. However, according to the techniques, since the transmission control of each of the other channels is performed by using the statistical data within a particular channel, there is no guarantee that the speech information having the smallest influences on the speech sound quality among all the channels is frozen-out. For example, even in the case where there existed important speech information in a certain channel A and speech information having small influences on the speech sound quality such as noise in another channel B, according to the prior art techniques, the "importance (likelihood of being speech)" is not compared between A and B. Therefore, the channels A and B will be controlled in the same way and thus speech information is cut down similarly for both the channels. Thus, it is desirable not to control important speech and noise in the same manner, but to freeze-out only speech having practically small influences on the speech sound quality.

SUMMARY OF THE INVENTION

An object of this invention is to provide a speech signal multiplexing system which is capable of controlling the amount of speech information to be multiplexed and is effective for use in a communication network where a number of terminals, which is greater than the number of transmission channels, are connected with the transmission line.

Another object of this invention is to provide a speech signal multiplexing system effective in minimizing degradation of speech sound quality in each channel at the transmission.

Still another object of this invention is to provide a speech signal multiplexing method which is capable of controlling the amount of speech information to be multiplexed and is effective for use in a communication network where a number of terminals, which is greater than the number of transmission channels, are connected with the transmission line.

According to an aspect of this invention, in the case where a number of requests for transmission of speech signals, which is greater than the number of channels of a transmission line, are made by a plurality of terminals and each speech signal is a digital speech signal including a series of speech unit signals (e.g. a series of speech frame signals): a weighted priority signal is produced for the speech unit signal corresponding to a speech signal coming from each of the terminals; an assignment signal is produced on the basis of the priority signals which assignment signal indicates the speech unit signals to be selected for transmission in the form of a train of multiplexed speech unit signals; and selection of a limited number of speech unit signals among the speech unit signals is carried out on the basis of the assignment signal for multiplexed transmission.

According to another aspect of this invention, when information representative of talk-spurts above the capacity of a transmission line is sent from plural terminals to the transmission line: various kinds of statistical data are calculated for each of the terminals by using speech unit signal information having been inputted, and information as to whether speech unit signals are selected for transmission; the various kinds of statistical data so calculated are weighted to produce a transmission discrimination signal indicating an allowable number of channels, the weighting of the various statistical data being determined, taking the degree of influence of deletion of the speech unit signal in question on the speech sound quality into consideration; and the inputted information of talk-spurts are multiplexed depending on the discrimination signal for transmission.

In an embodiment of this invention, for each of the channels, i.e. each of the terminals, statistical data from the past to the present are calculated by using e.g. the average value of the speech power, the amount of information of talk-spurts deleted in the past, the counter value for the rate of freeze-out, the counter values for the number of freeze-out bursts and for the number of frames, the counter value for the number of successive frames of talk-spurts, the counter value for the freeze-out interval, etc., and the calculated statistical data for different channels are compared with one another. Speech information of channels for which it is presumed that the degree of degradation of the speech sound quality is comparatively small are frozen out. By comparing the statistical data of different channels that are preferentially deleted, the total sum of the amount of speech information of various channels is kept within the limit allowable for the capacity of the transmission line. Here, as examples of the statistical data in embodying this invention, the following items are recited.

(a) The ratio of the speech power to the average value thereof.

The average value of the power is a moving average. The average is calculated e.g. for 3 frames from the past to the present successively moved. That is, the average is calculated at first for the 1st to 3rd frames, then the average is calculated for the 2nd to 4-th frames, and then the average is calculated for the 3rd to 5-th frames. In this way, the frames, for which the average is calculated, is moved by one frame successively.

(b) The talk-spurt information deleted in the past.

This is the number of speech frames, which have been not transmitted from the past to the present, although they are talk-spurts.

(c) The talk-spurt information continuously existing up to the present.

This is the count value of the number of continuous talk-spurt bursts held up to the present and represent a time length of talk-spurt.

(d) The number of freeze-out bursts.

This is the value obtained by counting transitions from a state where there exists a freeze-out to a state where there exists no freeze-out from the past to the present.

(e) The deleted talk-spurt information occurring continuously up to the present.

This is the count value obtained by counting the frames only during the period, where the talk spurt and the freeze out exist, using a speech detection signal.

(f) The number of frames successively assigned up to the present.

(g) The time measured from the latest one of the talk-spurt information burst deleted in the past.

This is the interval measured from the latest produced freeze-out burst, when the frames are counted from the point of time, where the freeze-out is released.

(h) The statistical data described in the items from (a) to (g) arbitrarily combined.

The statistical data (a) to (g) described above are multiplied by different weights and the sum obtained by adding them is used as a priority signal for one channel. At this time the weight of preceding ones as listed above is greater than that or a succeeding one. That is, the greatest weight is given to (a) the ratio of the speech power to the average value of the speech power and the second greatest weight is given to (b) the talk-spurt information deleted in the past.

BRIEF DESCRIPTION OF THE DRAWINGS

FIG. 3A is a diagram of a structure of assignment signal producing means in FIG. 1.

FIG. 4 is a diagram indicating the format of the assignment signal.

FIG. 5A is a diagram illustrating an example of a structure of the multiplexing means in FIG. 1.

FIG. 6 shows the format of the multiplexed speech signal frame including a multiplexed series of speech unit signals.

FIG. 7A is a diagram illustrating an example of a structure of the demultiplexing means in FIG. 1.

FIG. 9 is a diagram illustrating a structure of the header generator in FIG. 8.

FIG. 10 is a diagram indicating an example of the speech packet in FIG. 9.

DESCRIPTION OF THE PREFERRED EMBODIMENTS

Figure 1:
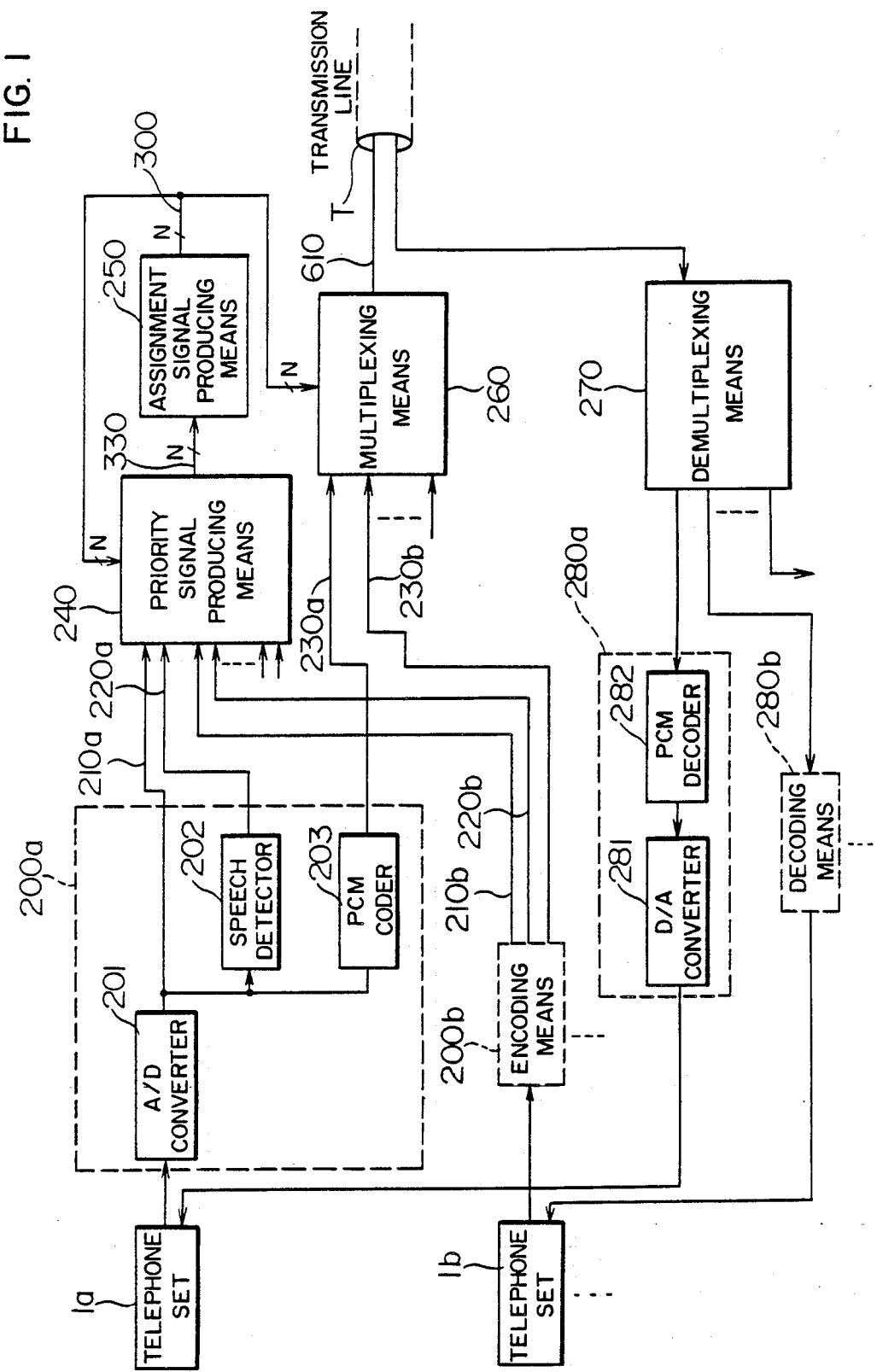
FIG. 1 is a block diagram illustrating a speech signal multiplexing system according to an embodiment of this invention.

FIG. 1 is a block diagram illustrating a structure of a system for multiplexing speech signals according to an embodiment of this invention.

A plurality of terminals, e.g. telephone sets 1a, 1b, --- are connected with a transmission line T having a number of channels, which is smaller than the number of the terminals. Analogue speech signals inputted to encoding means 200a, 200b, --- from the telephone sets 1a, 1b, --- are converted by an A/D converters 201 into digital speech signals, e.g. into PCM signals, ADPCM (Adaptive Differential PCM) signals, or the like. Further, digital speech signals, which are outputs of the A/D converters 201, are inputted to speech detectors 202 and it is judged for every frame, to which the inputted speech signals correspond, talk-spurt or silence. The techniques for the speech detector 202 are described e.g., in Transactions of the Institute of Electronics and Communication Engineers of Japan, 80/7, Vol. J63-A, No. 7, pp. 413-420 (in Japanese). The digital speech signal 210a outputted by the A/D converter 201 is supplied to priority signal producing means 240 and at the same time to DSI demultiplexing means 260 through a PCM coder 203. The PCM coder 203 compresses logarithmically the inputted digital speech signal and reduces the amount of the signal information. Although a coder 203 using PCM is indicated here, another coder such as ADPCM, multi-pulse coding, APC (Adaptive Predictive Coding), etc. may be used therefor.

Further a speech detection signal produced by the speech detector 202 is supplied to the priority signal producing means 240.

The priority signal producing means 240 calculates priority (a priority signal) for each channel, based on the (predetermined) presumed value of influences on the speech sound quality, in the case where the input speech signal (frame) for a channel, i.e. for a terminal (telephone set) is deleted, by using the past statistical data based on the statistical information including the digital speech signal 210, the speech detection signal 220 and the assignment signal 300. In this way the means 300 produces a priority signal 330 and supplies it to the assignment means 250.

The assignment signal producing means 250 selects a speech unit signal (a speech frame signal) in the order of the priority on the basis of the inputted priority signal and repeats the selection within the limit, where the total sum of the speech unit signals is below the value allowed by the capacity of the channels of the transmission line. The result of this processing is outputted from the assignment signal producing means 250 to a multiplexing means 260 as an assignment signal 300. The assignment signal 300 is supplied also to a plurality of statistical data memories included in the priority signal producing means 240 to update the statistical data for every channel stored therein.

The multiplexing means 260 multiplexes only the speech unit signals selected on the basis of the inputted assignment signal 300 to transmit it to the transmision line T.

On the other hand, a multiplexed speech signal received through the transmission line is demultiplexed for distribution to corresponding decoding means 280a, 280b, --- of the channels in a demultiplexing means 270 and converted thereinto speech signals to be outputted to the telephone sets 1a, 1b, ---.

In this embodiment, the DSI (Digital Speech Interpolation) techniques are used, which are disclosed, e.g., in Comsat Tech. Review, Vol. 6, No. 1, pp. 127–158.

Figure 2:
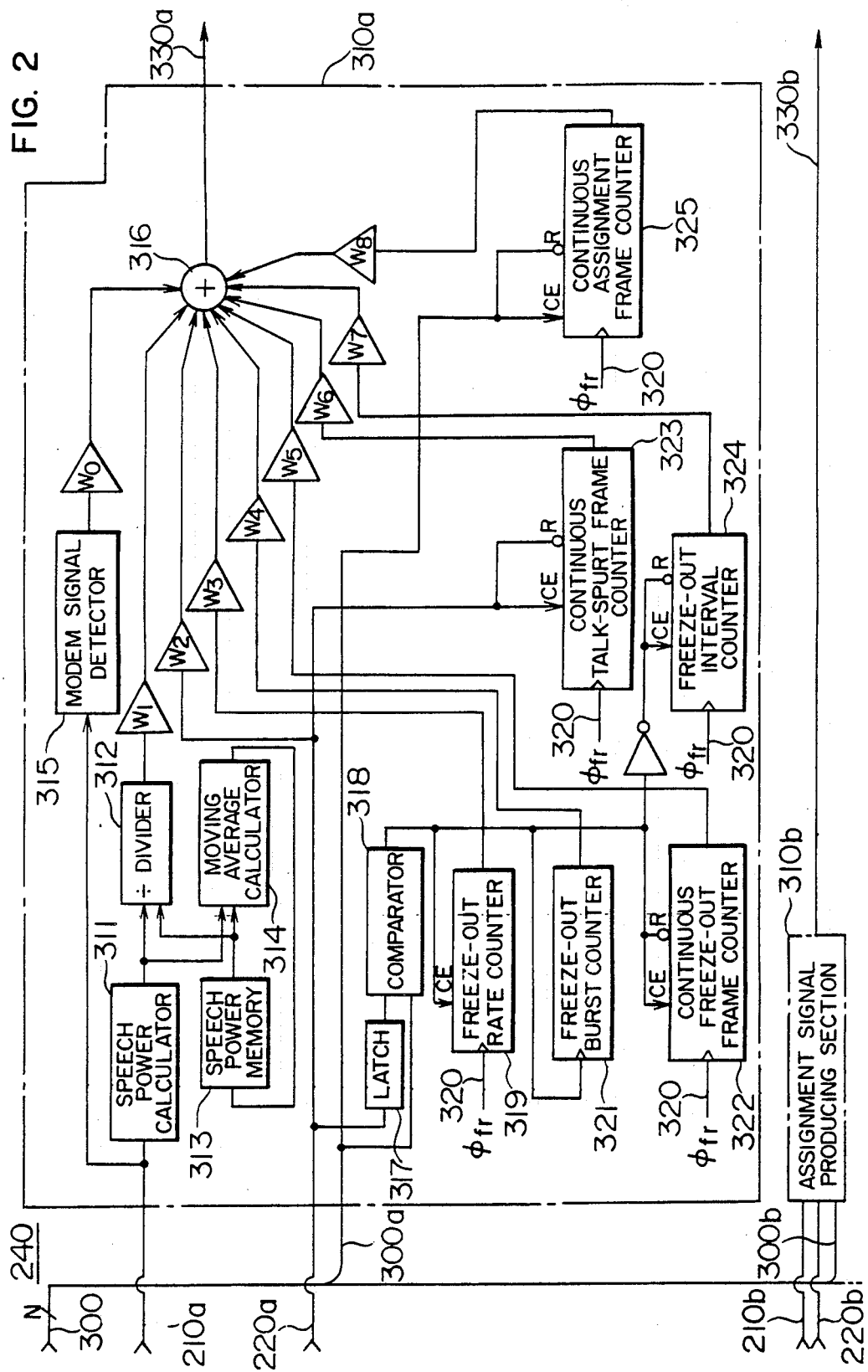
FIG. 2 is a block diagram of a structure of a priority signal producing means in FIG. 1.

FIG. 2 is a block diagram indicating a specific example of a structure of the priority signal producing means in FIG. 1.

As indicated in FIG. 2, the priority signal producing means 240 includes a plurality of priority signal producing sections (one priority signal producing section for ech terminal, i.e., for each channel) 310a, 310b, ---, and the A/D converted digital speech signal (speech unit signal) 210a (210b, ---), the speech detection signal 220a (220b, ---) and the assignment signal 300 from the assignment signal producing means 250 are inputted to each of the priority signal producing sections.

Each of the assignment signal producing sections 310 includes calculators and memories, as described below, in order to calculate, store and update various kinds of statistical data. Namely, there are provided a power calculator 311, a circuit 314 for calculating the moving average of the power and a speech power memory 313 for storing its calculated value, and the output of the power calculator 311 is divided by the output of the power moving average calculator 314 by means of a divider 312 to output a normalized power (first statistical data). A counter 319 counts the rate of freeze-out of the talk-spurt information representative of deleted talk-spurt information in the past (second statistical data) and stores it. Another counter 323 counts talk-spurt frames succeeding up to the present (third statistical data) and stores the number thereof. Still another counter 321 counts freeze-out burst (fourth statistical data) and stores the number thereof. Still another counter 322 counts deleted speech information succeeding up to the present (fifth statistical data), i.e. succeeding freeze-out frames and stores it. Still another counter 325 counts frames assigned successively up to the present (the sixth statistical data), i.e. continuous assignment frames, and stores the number thereof. Still another counter 324 counts the interval from the latest produced freeze-out burst (seventh statistical data) and stores it. Apart therefrom, there may be disposed at need a MODEM signal detector 315 judging whether an inputted digital speech signal (eighth statistical data) 210a is a MODEM signal related to the data transmission or not.

The output of the detector 315, the speech detection signal 220a and the output of the statistical data memories (counters 313, 319, 321-325) are inputted to an adder 316 through amplifiers $w_0$ to $w_8$, respectively, where all the inputs are summed up. Further, the weights multiplied with the various kinds of statistical data, i.e., the values of weighting, are set by varying the amplification factors of the amplifiers $w_0$ to $w_8$ described above.

Hereinbelow the operation of each of the priority signal producing sections will be explained, taking the priority signal producing section 240a as an example. An input speech power is calculated by the power calculator 311 on the basis of the inputted speech signal 210a and the ratio of the result to the average power stored in the speech power memory 313 is calculated (divided by means of the divider 312), which ratio is outputted to the adder 316 through the amplifier $w_1$ as the first statistical data. The weight for this first statistical data is the greatest and consequently the amplification factor of the amplifier $w_1$ is the greatest. Further, the moving average calculator 314 calculates the speech power and the moving average of the average power and updates the content of the speech power memory 313.

In addition, the output of a freeze-out rate counter 319 indicating the, number of speech frames, to which no transmission privilege has been assigned up to the present, although they are talk-spurt information is sent to the adder 316 as the second statistical data. The amplification factor of the amplifier $w_3$ is set to be the second greatest, following the amplifier $w_1$ amplifying the first statistical data. Further, the output of a latch circuit 317 which latches the speech detection signal 220a, and the assignment signal 300a of the speech signal for this signal 220a are inputted to a comparator 318 and a result obtained by comparing them is inputted to the freeze-out rate counter 319 as a count enable signal (CE). Furthermore, a frame clock signal $\phi_{fr}$ having a same period (e.g. 20 msec) as the frame length of the digital speech signal 230a (FIG. 1) is inputted to the freeze-out rate counter 319. Consequently, the freeze-out rate counter 319 is enabled, when the speech detection signal represents a talk-spurt and the assignment signal indicates that no priviledge of transmission line has been assigned. As the result, this counter 319 counts cycles of the frame clock signal frozen out.

The output of the comparator 318 stated above is supplied as the clock input of a freeze-out burst counter 321 as it is.

Figure 12:
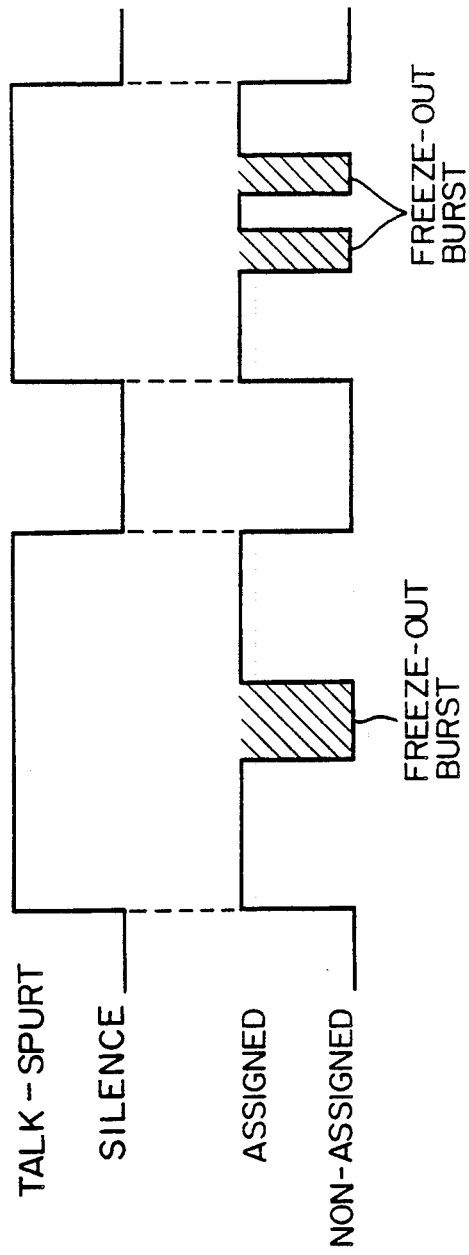
FIGS. 12 and 13 are diagrams for explaining calculations of statistical data.

Since the freeze-out burst counter 321 is always enabled, transitions from the state where there exists the freeze-out to the state where there exists no freeze-out are counted. That is, since the comparator 318 outputs "1" in the state where there exists the freeze-out and "0" in the state where there exists no freeze-out, the freeze-out burst counter 321 counts changes from "1" to "0". A freeze-out burst means a block, in which no assignment of transmission priviledge occurs, i.e., a freeze-out occurs, although speech unit signals in the blocks represent talk-spurts. More specifically, as shown in FIG. 12, a first assignment takes place during a talk-spurt; a second assignment takes place again after a freeze-out has occurred in the course; no assignment takes place during the silence; then a third assignment takes place; and a fourth and a fifth assignment take place after a second freeze-out with a third freeze-out therebetween. In the case indicated in FIG. 12, the number of freeze-out bursts is the same as the number of hatched parts, which is 3. That is, this counter 321 counts units (bursts), one unit being a block during which freeze-out continues. The output of this counter 321 is sent to the adder 316 through the amplifier $w_4$ as the fourth statistical data. The weight for these statistical data may be smaller than those for the first and the second statistical data.

Figure 13:
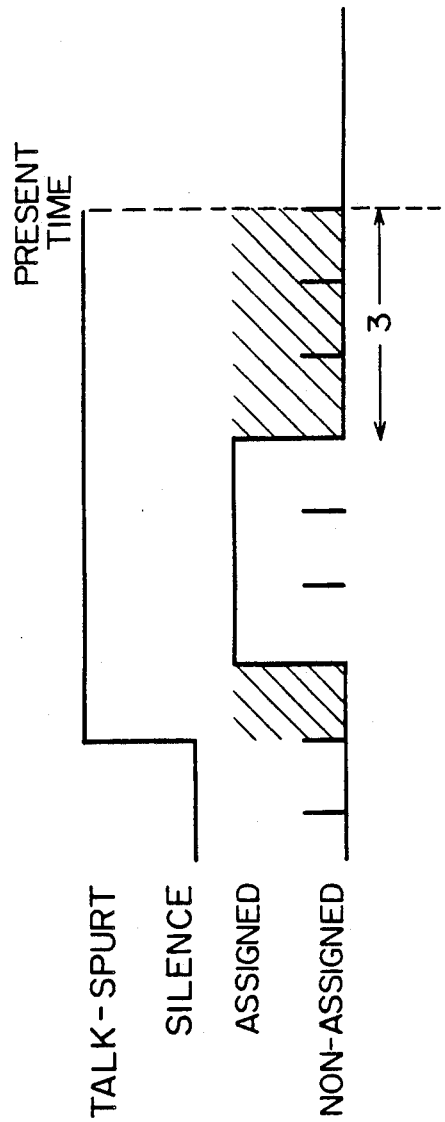

Further, the output of the comparator 318 stated above is supplied as an enable signal (EC) and a reset signal (R) for a continuous freeze-out frame counter 322. Owing to the output of the comparator 318, this counter 322 continues to count cycles of the frame clock signal only during a period in which the freeze-out of successive frames continues, and it is reset at the point of time where the freeze-out is released. That is, this counter 322 counts the length of freeze-out bursts (the number of frames) held up to the present. The number of continuous freeze-out frames means the number of frames counted from the point of time where the latest assignment is released to the present in a period of time of talk-spurts, i.e. the number of frames, for which a freeze-out continues up to the present, as indicated in FIG. 13. In FIG. 13, the number of continuous freeze-out frames is 3. The output of this counter 322 is sent to the adder 316 through the amplifier $w_5$ as the fifth statistical data.

Now, turning back to FIG. 2, the speech detection signal 220a is sent to the adder 316 through the amplifier $w_2$ and at the same time supplied as the enable signal (CE) and the reset signal (R) of a continuous talk-spurt frame counter 323. Further, the frame clock signal $\phi_{fr}$ is supplied as a clock signal 320. This counter 323 continues to count cycles of the frame clock signal $\phi_{fr}$ during a period of time, where the speech detection signal represents a talk spurt and it is reset at the point of time, where the speech detection signal represents silence. That is, this counter 323 counts the length of talk-spurt bursts (the number of talk-spurt frames) appearing up to the present and the output thereof is sent to the adder 316 through the amplifier $w_6$ as the third statistical data.

In addition, the assignment signal 300a is supplied as the enable signal (CE) of the reset signal (R) for the continuous assignment frame counter 325 and the frame clock signal $\phi_{fr}$ is supplied as the clock signal 320. This counter 325 counts assignment frames appearing up to the present and the output thereof is sent to the adder 316 through the amplifier $w_8$ as the sixth statistical data.

Furthermore, the output of the comparator 318 indicating the freeze-out frames stated above is inverted and supplied as the enable signal (CE) and the reset signal (R) for a freeze-out interval counter 324. Further, the frame clock signal $\phi_{fr}$ is supplied as the clock signal 320. This counter 324 is reset during a period of time where the freeze-out occurs and begins to count frames at the point of time when the freeze-out is released. That is, this counter 324 counts the interval from the latest produced freeze-out burst to the present and the output thereof is sent to the adder 316 through the amplifier $w_7$ as the seventh statistical data.

Furthermore, it is judged in a MODEM signal detector 315 whether the inputted digital speech signal 210 is a MODEM signal or not. The detection of the MODEM signal in this case can be realized e.g. by supplying simultaneously the input signal to an estimating or predicting device fitted for the MODEM signal and another estimating or predicting device fitted for the speech signal and comparing the gains for their estimated outputs with each other. That is, the speech signal and the MODEM signal are fairly different in nature, i.e., the frequency domain of the MODEM signal is narrow, contrarily to the fact that the frequency domain of the speech signal is wide. Consequently, by utilizing, e.g., the fact that the signal value at a certain point of time is predictable in some degree by adding the values of n past sample values on the basis of their correlation, the speech signal and the MODEM signal are estimated by means of predictors. The method of detecting the MODEM signal is described in detail, e.g., in Proceedings of IECE (Institute of Electronics and Communication Engineers of Japan) National Convention, 1987, pp. 2-111 (in Japanese). The output of this MODEM signal detector 315 is sent to the adder 316 through the amplifier $w_0$ as the eighth statistical data.

In this way the various kinds of the statistical data and the speech detection signal 220a are multiplied by the weights, which are proper to the various kinds of the statistical data, by means of the amplifiers $w_0$ to $w_8$ and by obtaining the total sum of the multiplication results by means of the adder 316, the output of the result is supplied to the assignment means 250 as the priority signals 330a (330b, 330c, ---) weighted for every trunk (terminal).

FIG. 3A is a diagram indicating an example of a structure of assignment signal producing means in FIG. 1.

The assignment means 250 comprises a sorter 401 and an assignment signal generator 402, as indicated in FIG. 3A. At first, the numbers of all the input trunks, the priority signals 330a, 330b, --- for the respective trunks and an allowable number of channels for which assignments are given are inputted to the sorter 401. The sorter 401 comprises a comparator for sorting the weighted priority signals for the respective trunks in the descending order of the priority or the magnitude of the signals and a limiter for setting the allowable number of channels. For example, when the magnitudes of the weighted priority signals of the trunk numbers 1, 2 and 3 are 4, 7 and 1, respectively, the sorter 401 sorts the corresponding trunk numbers 2, 1 and 3 in the descending order of the magnitude of the weighted priority signal to output them. At this time, such number of trunks as specified by the allowable number of channels are sorted and outputted. The example described above is a case where the number of trunks specified by the allowable number of channels is 3. This output (trunk number signal) TR is converted into an assignment signal 300 in an assignment signal generator 402 and sent to the multiplexing means 260 and the assignment signal producing means 240.

Figure 3B:
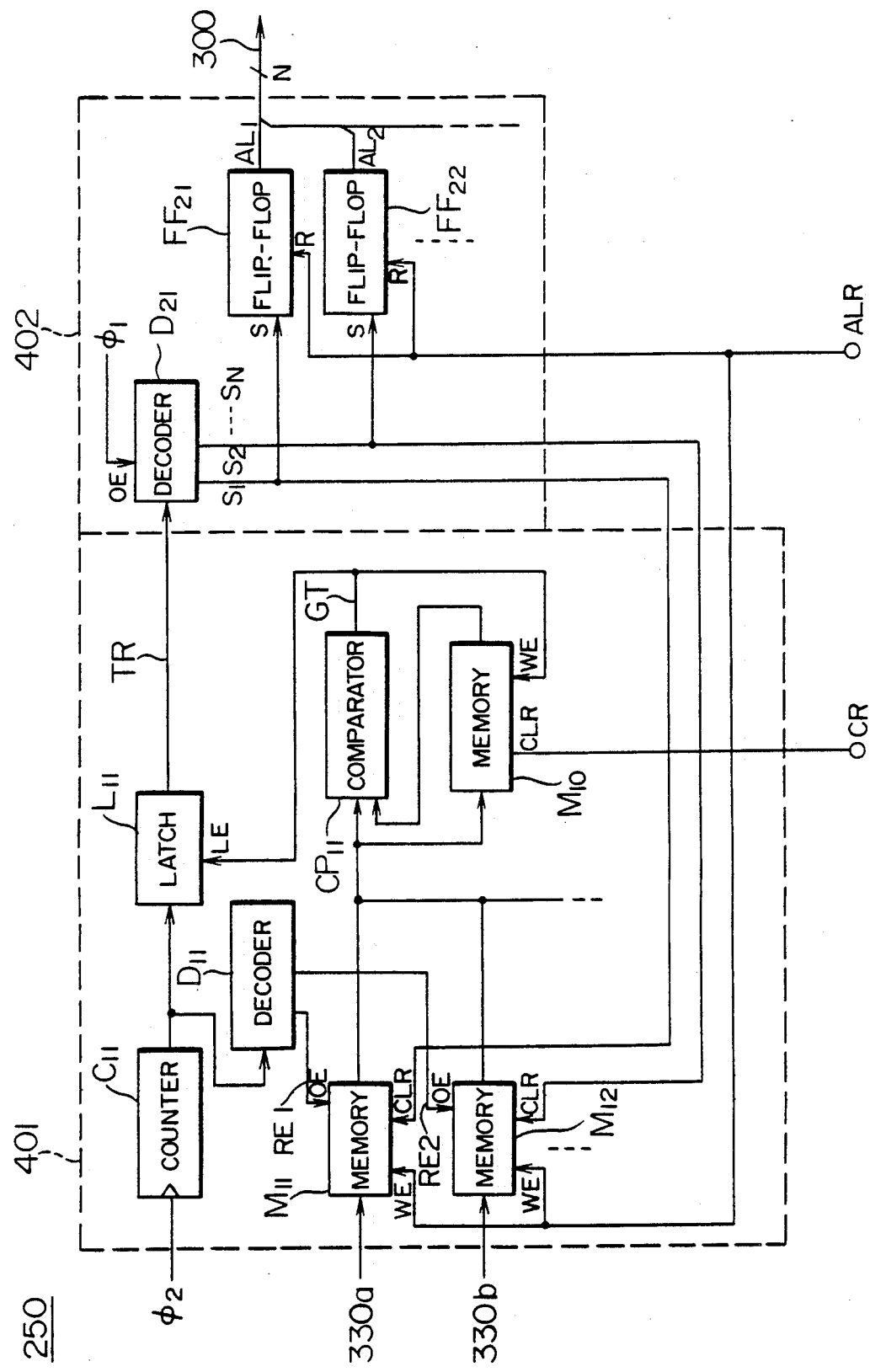
FIGS. 3B and 3C are diagrams illustrating a specific example of a structure of the assignment signal producing means in FIG. 3A and operation waveforms appearing in various parts therein, respectively.
Figure 3C:
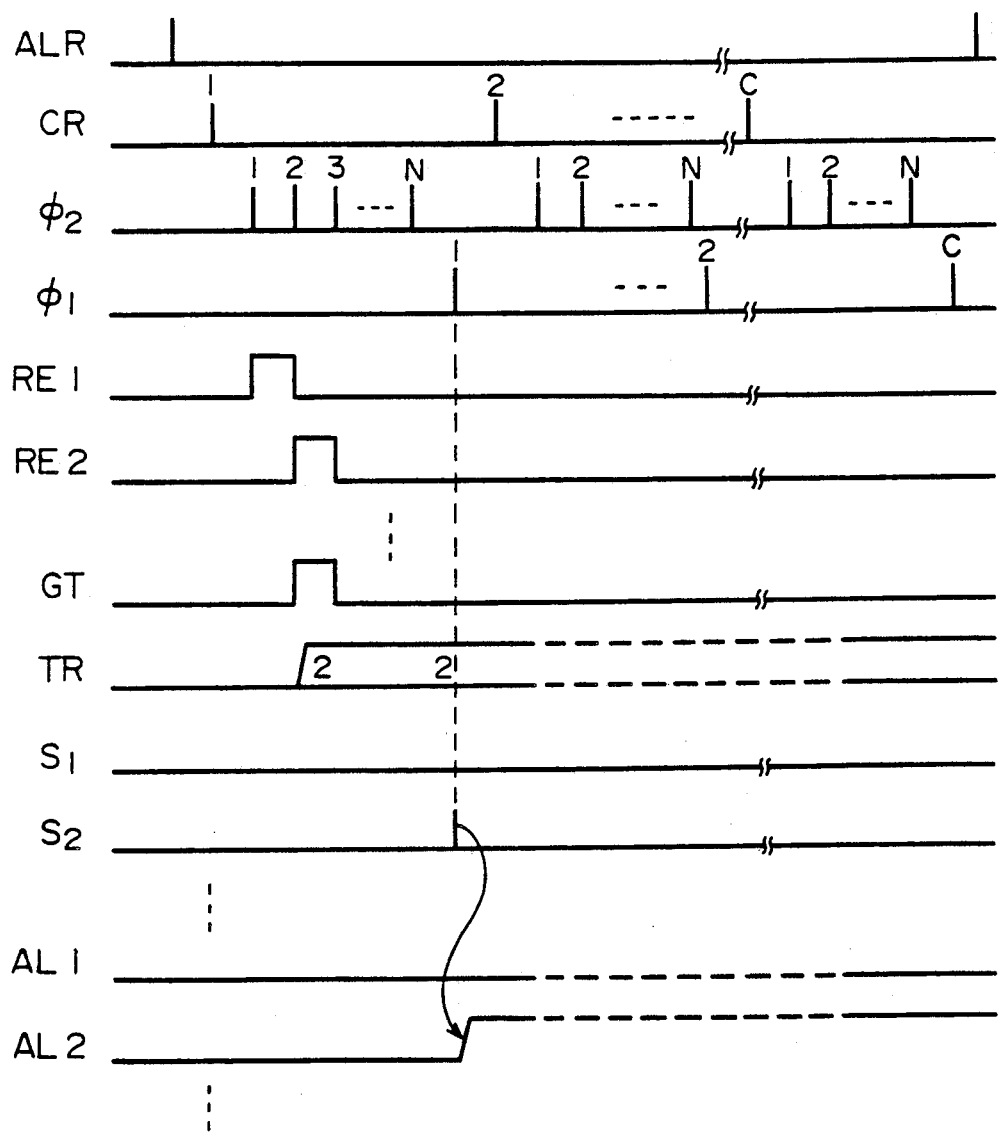

FIG. 3B shows a more specific example of a structure of the assignment signal producing means 250. FIG. 3C indicates waveforms, which are useful for understanding the operation of the structure shown in FIG. 3B.

The operation of the assignment signal producing means 250 will be explained below, referring to FIGS. 3B and 3C.

At first, all the assignment flipflops $FF_{21}$, $FF_{22}$, --- in the assignment signal generator 402 are reset (Terminal R) and at the same time the priority signals 330a, 330b, --- of the N trunks are stored in statistical data memory $M_{11}$, $M_{12}$, ---, respectively, in the sorter 401 (indicated by WE). These are operated in synchronism with a clock signal ALR. Further, a maximum value storing memory $M_{10}$ is cleared by another clock signal CR to "0".

Then, a count-up clock signal $\phi_2$ is inputted to a counter $C_{11}$. The output of this counter $C_{11}$ is inputted to a decoder $D_{11}$ and the values of the priority signals (weights) for the trunks corresponding to the count of the counter $C_{11}$ are read out from the memories $M_{11}$, $M_{12}$, --- so that they are successively compared with the content of the maximum value storing memory $M_{10}$ in a comparator $CP_{11}$. In the case where the weight of the inputted priority signal is greater than the content of the memory $M_{10}$, the output GT of the comparator $CP_{11}$ is valid and the count of the counter $C_{11}$ at this time, i.e. the trunk number TR is latched in an latch $L_{11}$ (terminal LE). Further, the weight of the priority signal at this time is stored in the memory $M_{10}$ (terminal WE). In the case where the output GT is invalid, the contents of the latch $L_{11}$ and the memory $M_{10}$ remain unchanged. The greatest weight of those of the priority signals is stored in the memory $M_{10}$ and the trunk number TR in the latch $L_{11}$ by repeating this processing N (number of trunks) times. This trunk number TR is inputted to the assignment signal generator 402.

The assignment signal generator 402 decodes the inputted trunk number TR in synchronism with the clock signal $\phi_1$ and validates the output line $S_i$ ($S_2$ in the figure), whose weight corresponds to the highest priority signal. The output line $S_i$ sets the flipflop for the assignment signal of the corresponding trunk and at the same time clears the content of the statistical data memory $M_{1i}$ of the corresponding trunk in the sorter 401 (terminal CLR). Consequently, when the process for determining the trunk having the priority signal with the second greatest weight is effected, the priority signal of this trunk is excluded. The clear signal CR is inputted in the memory $M_{10}$ and a similar process is started, in order to extract the priority signal with the weight which is the greatest next to the weight of the priority signal of this trunk.

By repeating the process described above C (allowable number of output channels) times, a state in which C flipflops are set among the assignment flipflops $FF_{21}$, $FF_{22}$, --- is realized and assignment is given to each of the speech unit signals from the allowable number of trunks. In this way, an assignment signal 300 consisting of N bits ($AL_1$-$AL_N$) is obtained.

FIG. 4 shows an example of the format for the assignment signal 300 in FIG. 3.

The assignment signal 300 includes a series of assignment codes (bits) arranged in the order of the corresponding trunk numbers. In the case indicated in FIG. 4, it is supposed that, when the value of the assignment code is "0", no assignment is given to a trunk indicated by a corresponding trunk number and when it is "1", assignment is given thereto.

FIG. 5A is a diagram illustrating a structure of the multiplexing means 260 in FIG. 1.

The multiplexing means 260 comprises a transmission discrimination signal producing section 601 and a time division switch bank 602. A transmission discrimination signal 600 coming from the transmission discrimination signal producing section 601, the assignment signal 300 and PCM speech unit signals 230a, 230b, --coming from the PCM coder 203 corresponding to the telephone sets 1a, 1b, --- are inputted to the time division switch bank 602. In the multiplexing means 260, at first, in the transmission discrimination producing section 601, the transmission discrimination signal 600 representing those priority signals, which are made valid by the assignment by means of the assignment signal 300 and indicate the trunk numbers in the descending order of the priority is supplied to the time division switch bank 602. In the time division switch bank 602, at first a frame sync signal 611 for frame synchronization, which is supplied by a frame, synchronization signal generator 603, and the assignment signal 300 are multiplexed. Then the PCM speech unit signals 230a, 230b, --- provided with priority signals corresponding to the transmission discrimination signal 600 supplied by the transmission discrimination signal producing section 601 are multiplexed in this order and finally a multiplexed speech signal 610 including the PCM signals of the trunks, whose number is the total number (C) of allowed channels, is obtained.

Figure 5B:
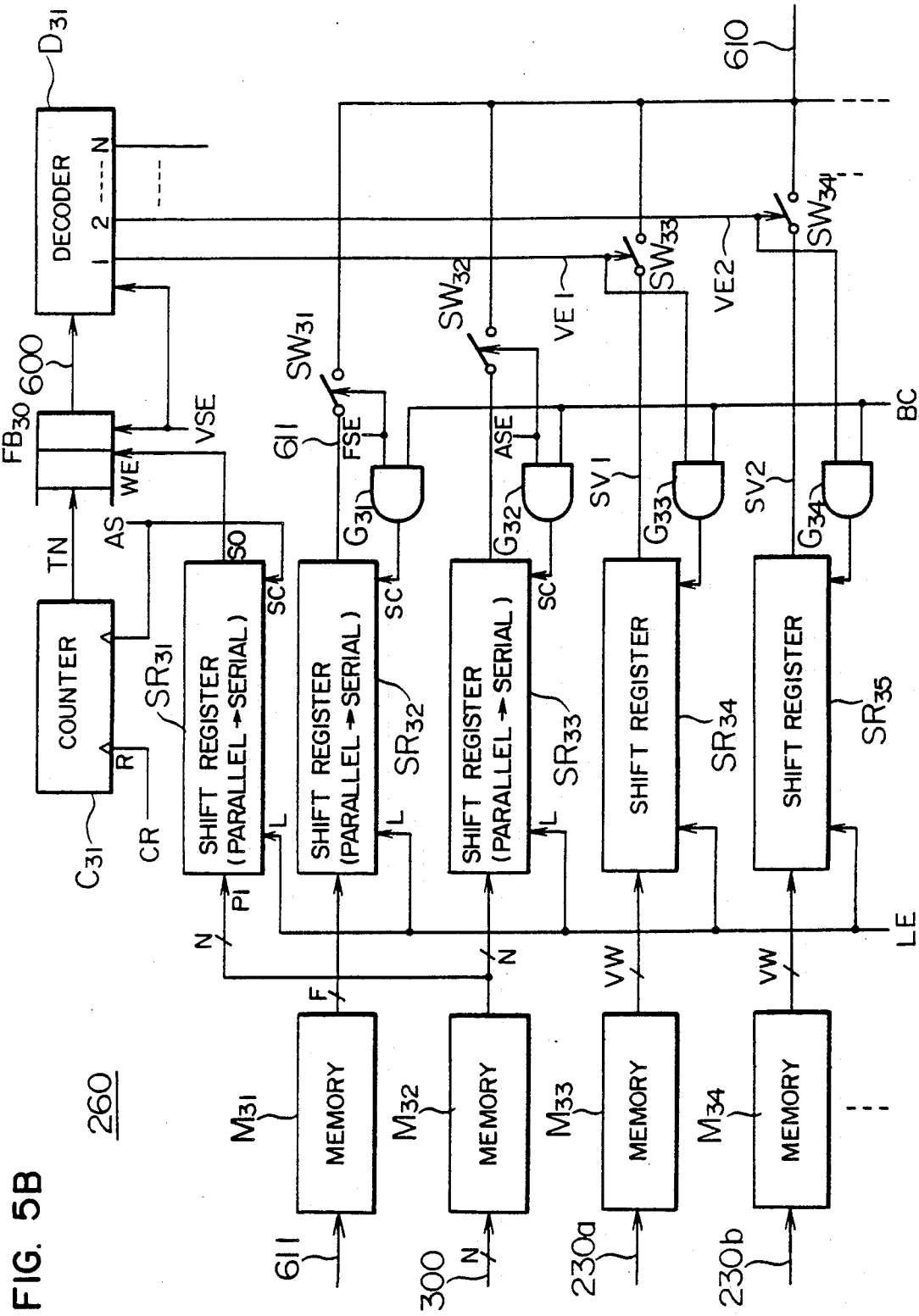
FIGS. 5B and 5C are diagrams illustrating a specific example of a structure of the multiplexing means in FIG. 5A and operation waveforms appearing in various parts therein, respectively.
Figure 5C:
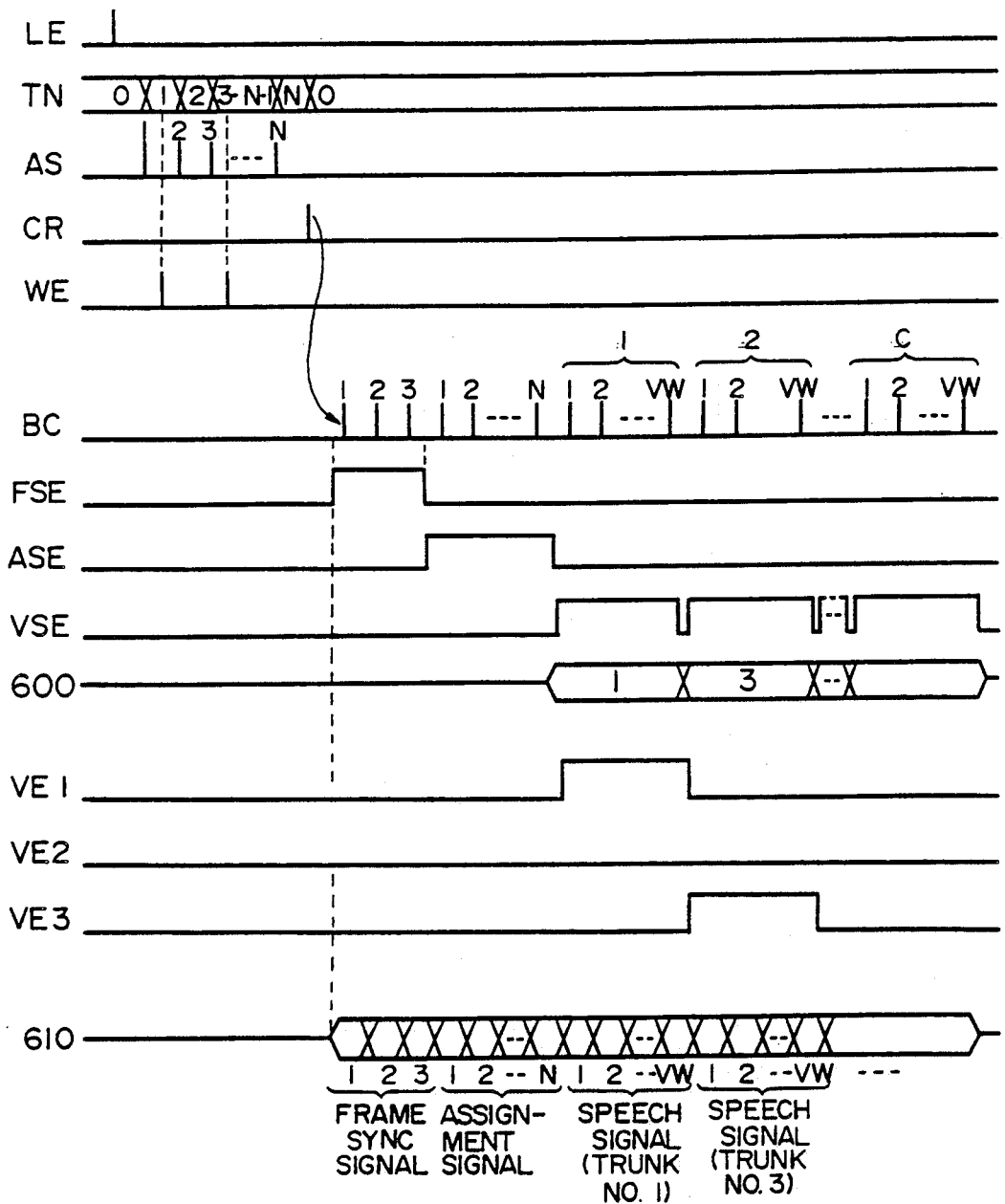

FIG. 5B shows a more specific example of the multiplexing means 260. FIG. 5C indicates waveforms, which are useful for understanding the operation of the structure shown in FIG. 5B.

The operation of the multiplexing means 260 will be explained below, referring to FIGS. 5B and 5C.

The frame synchronization signal 611, the assignment signal 300 and the PCM speech unit signals 230a, 230b, --- of different trunks are stored in separate memories $M_{31}$, $M_{32}$, ---. These signals 611, 300, 230 are loaded simultaneously in corresponding parallel-serial converting shift registers $SR_{31}$, $SR_{32}$, --- by a latch signal LE (terminal L).

Then the trunk numbers, to which assignment is given on the basis of the assignment signal 300 are decoded. That is, a transmission discrimination signal 600 is produced. The assignment signal 300 latched in the shift register $SR_{31}$ is converted in serial by a clock signal AS (terminal SC) and assignment codes are outputted in the increasing order of trunk number to provide a write enable signal WE for an FIFO buffer $FB_{30}$. Since the clock signal AS serves also as a countup clock for the counter $C_{31}$ previously reset, the count TN is the trunk number TN, to which the output of the shift register $SR_{31}$ at a certain point of time corresponds. This trunk number is inputted to the FIFO buffer $FB_{30}$, only when the output SO of the shift register $SR_{31}$ is valid, i.e. when assignment is given to the trunk number in question. Consequently, at the point of time where scanning of all the N trunks, C trunk numbers, to which assignment is given, are stored within the FIFO buffer $FB_{30}$ in the increasing order of trunk numbers. (Namely, the transmission discrimination signal 600 is stored in the buffer $FB_{30}$.) At the termination of the scanning, the counter $C_{31}$ is reset by the clock signal CR (terminal R).

The frame synchronization signal 611 is latched in the shift register $SR_{32}$. The frame synchronization signal 611 converted in serial by means of the clock signal obtained by forming a logical AND of an enable signal FSE and a bit clock signal BC of the transmission line in an AND gate $G_{31}$ is outputted by this shift register $SR_{32}$. The enable signal FSE has a width capable of making a bit clock having a same number of bits as the number of bits F of the frame synchronization signal 611.

Then, the assignment signal 300 latched in the shift register $SR_{33}$ is also outputted in serial. However, at this time, a clock signal ASE is used as the enable signal for the shift clock. The clock signal ASE becomes valid, after the enable signal FSE has become invalid, and the same number of bit clocks as the number of bits of the assignment signal 300 (=number of all trunks N) are supplied to the shift register $SR_{33}$.

Then, the PCM speech unit signals 230a, 230b, --- of different trunks are serial-converted. At first, the transmission discrimination signal 600 representing the assignment trunk number stored in the FIFO buffer $FB_{30}$ is read out at the point of time where the speech multiplex frame signal (VSE) has become enabled, and inputted to a decoder $D_{31}$. The decoder makes the output signal ($VE_i$) of the corresponding trunk number valid. $VE_i$ turns on switches $SW_{33}$, $SW_{34}$, --- connected with the output of the corresponding trunk shift registers $SR_{34}$, $SR_{35}$, ---, and further the bit clock signal BC is supplied as a shift clock (terminal SC). This state continues for a period of the bit clock corresponding to the total number of bits (VW) of the speech unit signal and the corresponding speech unit signals $SV_i$ is outputted from the shift registers SR. After that, the speech multiplexed frame signal VSE is again enabled, after having been for an instant disabled, and the succeeding assignment trunk number stored in the FIFO buffer $FB_{30}$ is read out, the process described above being repeated. This process is repeated a number of assignment trunks times and thus one frame of a multiplexed speech signal 610 is obtained.

FIG. 6 shows an example of the format of the multiplexed speech signal in FIG. 5.

As indicated in FIG. 6, the frame synchronization signal 611 for the frame synchronization and the assignment signal 300 are arranged in this order at the beginning of the multiplexed speech signal 610. Following them, the PCM speech unit signals (speech frame signals) of the trunks, to which assignment is given, are arranged in the order. In the example indicated in the figure, a case where assignment is given to first trunk, third trunk, --- N-th trunk, is shown. The multiplexed speech signal 610 obtained in this way is sent to the speech demultiplexing system in a station of another party through the transmission line T.

On the other hand, a multiplexed speech signal transmitted from a station of another party is inputted at first in the DSI demultiplexing means 270, as indicated in FIG. 1.

FIG. 7A indicates an example of a structure of the demultiplexing means 270. The demultiplexing means 270 includes a separating section 910 for extracting a frame synchronization signal 611, an assignment signal 300, and a speech unit signal train 230 from the speech multiplexing signal 610; a speech channel discrimination signal producing section 930, which receives the assignment signal 300 and produces a speech channel discrimination signal 600' representing the trunk numbers of the speech unit signals transmitted therefrom; and a time division switch bank 940 separating the speech unit signal train 230 into speech unit signals of separate channels (trunks). A frame synchronization signal detector 920 performs the operation to judge whether the received speech multiplexing signal 610 is a signal to be received or not, on the basis of the extracted frame synchronization signal 611. In the case where it is not a signal to be received, a frame synchronization error signal FE is produced.

Figure 7B:
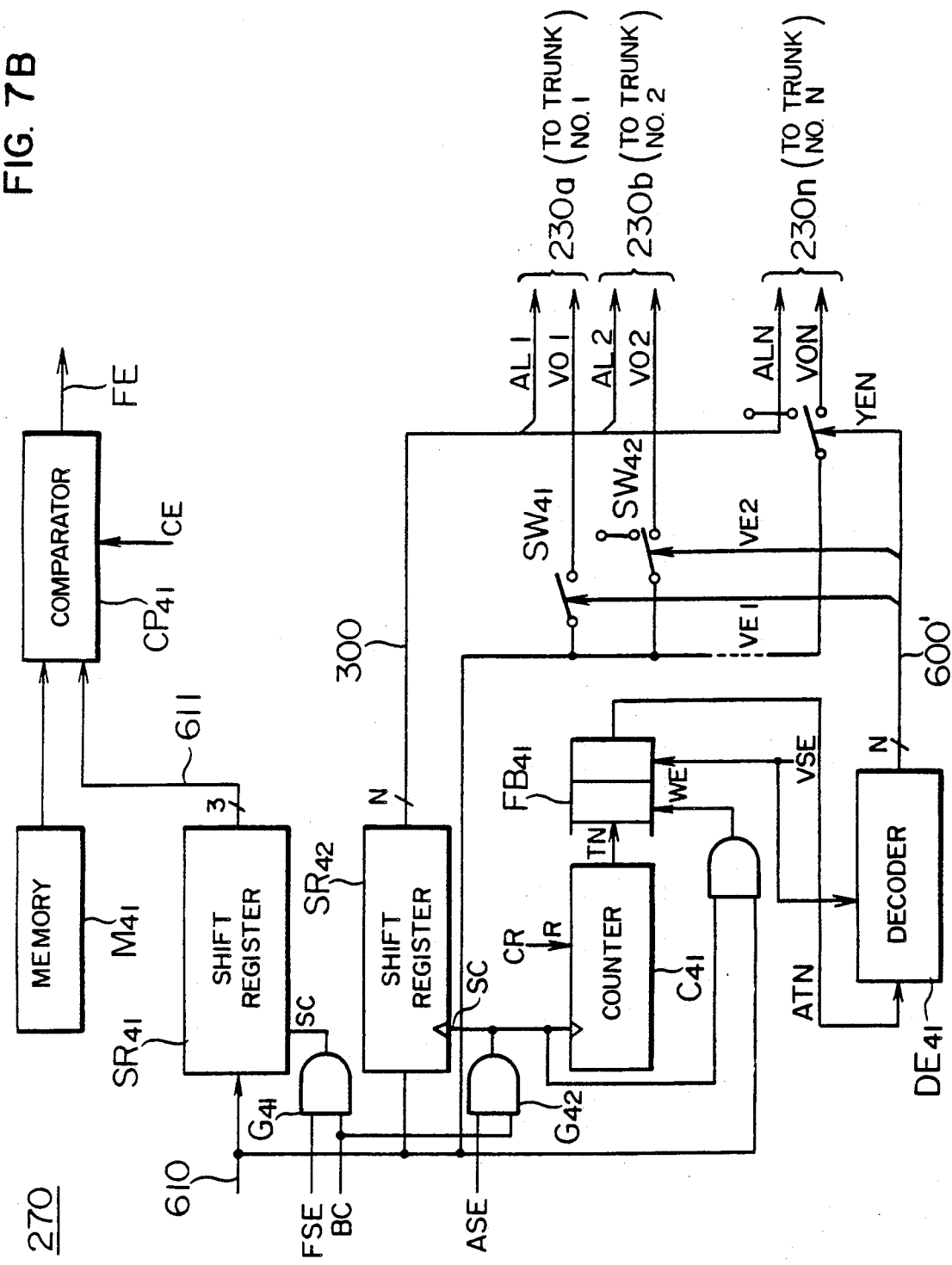
FIGS. 7B and 7C are diagrams illustrating a specific example of a structure of the demultiplexing means in FIG. 7A and operation waveforms, respectively.
Figure 7C:
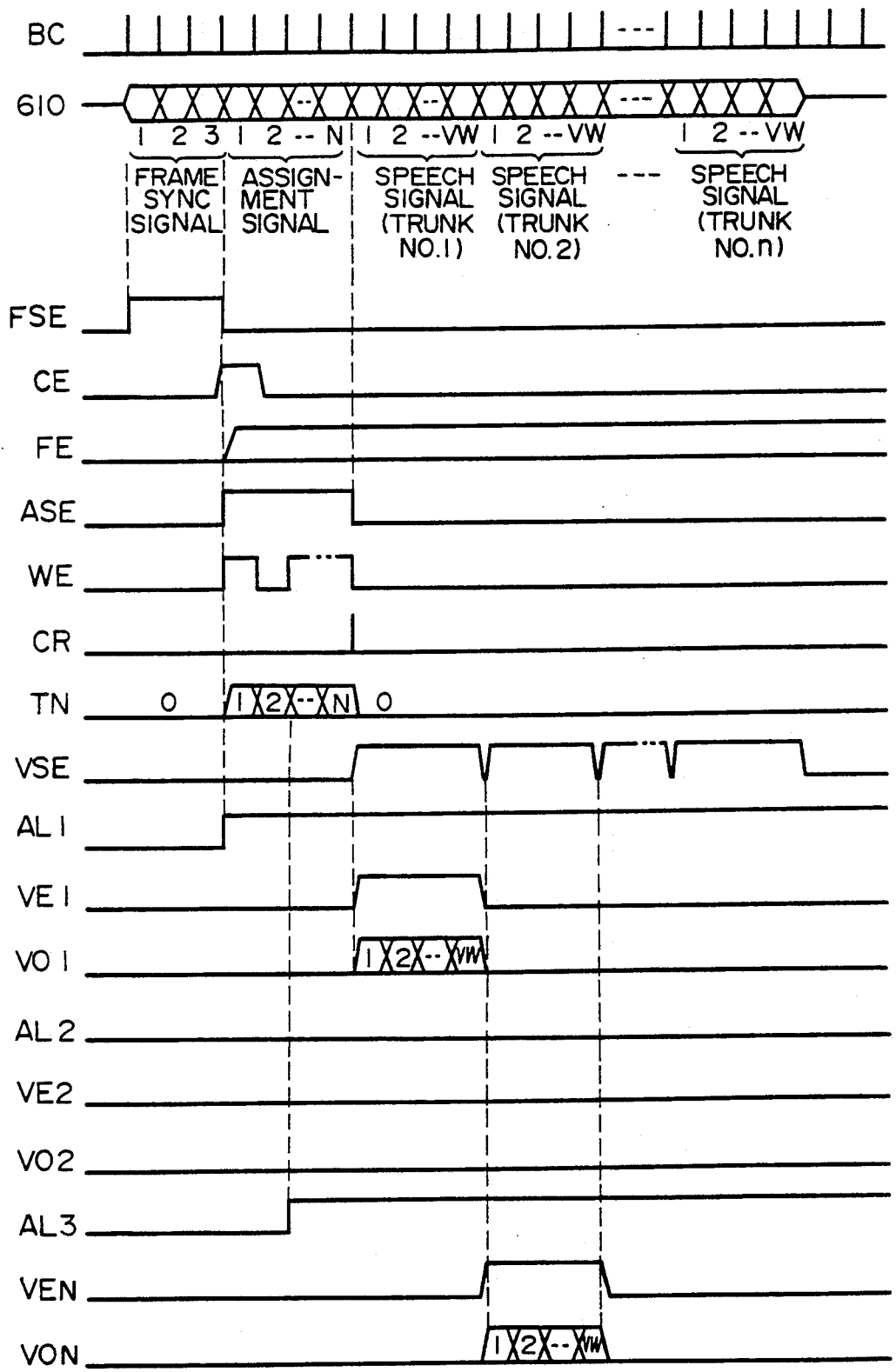

FIG. 7B shows a more specific example of a structure of the demultiplexing means 270. FIG. 7C indicates waveforms, which are useful for understanding the operation of the structure shown in FIG. 7B.

The operation of the demultiplexing means 270 will be explained below, referring to FIGS. 7B and 7C.

A multiplexed speech signal in a bit serial format 610 is inputted at first to a shift register $SR_{41}$. The clock to this shift register $SR_{41}$ is obtained by forming a logical AND of the enable signal FSE and the bit clock signal BC of the transmission line by means of an AND gate $G_{41}$ (terminal SC). The signal FSE becomes valid from the beginning of the multiplexed speech signal frame and has a width of a period of the bit clock having the same number of bits as the frame synchronization signal 611. A frame synchronization signal 611 converted in parallel is outputted from the shift register $SR_{41}$. The signal 611 is compared with a frame pattern previously stored in a memory $M_{41}$. If they are not in accordance with each other, a frame synchronization error signal FE is supplied to a controller.

The assignment signal 300 is shift-inputted to a shift register $SR_{42}$. The shift clock to the shift register $SR_{42}$ is obtained by forming a logical AND of a clock signal ASE, which becomes enabled only in a duration of the assignment signal 300 of the multiplexed speech signal 610, and the bit clock signal BC by means of an AND gate $G_{42}$ (terminal SC). This clock serves also as a count-up signal for a counter $C_{41}$ stated later. The output of the shift register $SR_{42}$ is the assignment signal 300 ($AL_i$) for the respective corresponding trunks.

On the other hand, the output TN of the counter $C_{41}$ stated previously corresponds to the trunk number representing the assignment signal 300. The output TN of the counter $C_{41}$ is inputted to the FIFO buffer $B_{41}$, only when the assignment signal 300 is valid (i.e. by the write enable signal WE). Consequently, the trunk numbers, to which assignment is given, are stored in the FIFO buffer $FB_{41}$ in the increasing order of the trunk numbers at the point of time where all the assignment signal 300 has been scanned. The counter $C_{41}$ is reset at the same time as the termination of the scanning.

This FIFO buffer $FB_{41}$ is read out also in the order together with the enable signal VSE (ATN) and inputted to the decoder $DE_{41}$. The decoder $DE_{41}$ makes valid the enable signal ($VE_i$) of the trunk number corresponding to the output ATN of the FIFO buffer $FB_{41}$. During this period of time, the output switch SW of the corresponding trunk is turned on and thus speech unit signals contained in one frame of the multiplexed speech signal are outputted. That is, VSE is held valid during a period of time where the PCM speech unit signal of one trunk is outputted, and it becomes again valid after having been invalid for an instant. At this time, the trunk number to which succeeding assignment is given is read out from the FIFO buffer $FB_{41}$. The processing described above is repeated until the PCM speech signals 230a, 230b, --- of all the assignment trunks are read out.

The PCM speech unit signals thus separated are distributed to the PCM encoders 282 in the encoding means 280 of the respective trunks. The PCM encoders 282 of the respective trunks expands the logarithmically compressed PCM codes. Further, these signals are converted into analogue speech signals by means of a D/A converter 281 and supplied to the respective telephone sets 1.

In this way, in the embodiment indicated in FIG. 1, when the amount of talk-spurt information to be transmitted is required to be reduced (by, e.g., freeze-out employed in the DSI technique) in a case where a number of speech signals greater than an allowable number of speech signals which can be transmitted by a transmission line T are concentrated beyond the channel capacity of the transmission line, it is possible to freeze out speech information of trunks in an effort to delete only those having small influences on the speech sound quality for the trunks so that the degradation of the speech sound quality may be minimized.

Figure 8:
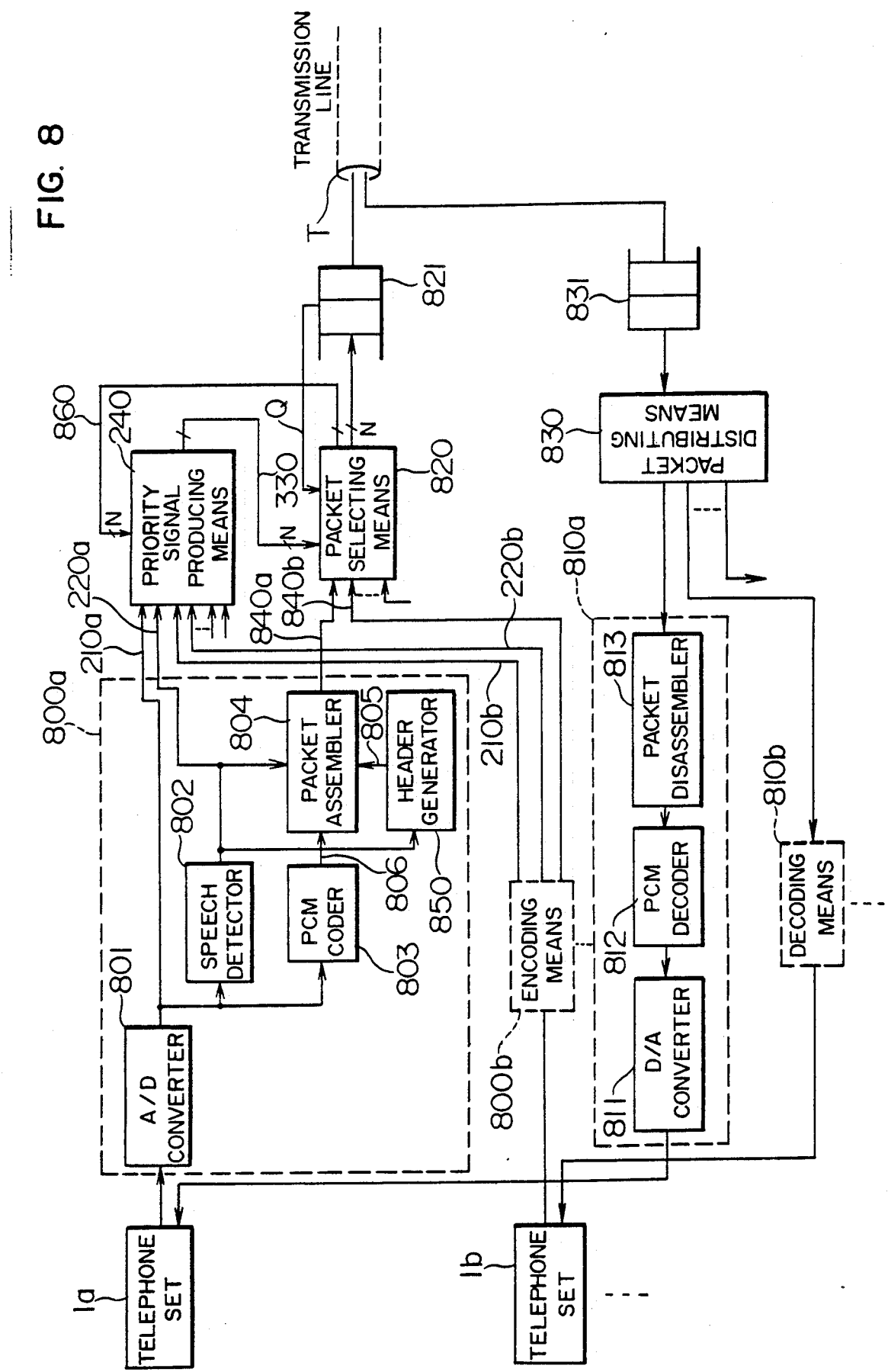
FIG. 8 is a block diagram of a speech packet multiplexing system according to another embodiment of this invention.

FIG. 8 is a block diagram illustrating a structure of a system for multiplexing speech signals, according to another embodiment of this invention.

This embodiment shows an example, in which speech packets are utilized. The speech packet communication is described e.g. in IECE (Institute of Electronics and Communication Engineers of Japan) Technical Report SE 87-69 (1987) pp. 25-30 (in Japanese).

Analogue speech signals inputted from telephone sets 1a, 1b, --- to encoding means 800a, 800b, ---, respectively, are converted at first into digital speech signals in A/D converters 801. They are, then, outputted to a priority signal producing means 240, respective speech detectors 802 and respective PCM codes 803. Although a PCM coder is used here, it is not restricted thereto, but a coder by ADPCM, multi-pulse coding, APC, etc. may be used therefor as well.

The output of the PCM coder 803 is sent to a packet assembler 804 and the output 220 of the speech detector 802 in each of the encoding means 800a, 800b, --- is supplied to the packet assembler 804, the priority signal producing means 204 and a header generator 850.

The packet assembler 804 assembles a packet on the basis of the PCM speech unit signal 806 supplied by the PCM coder 803 and the header signal 805 supplied by the header generator 850, only for information corresponding to talk-spurts among the speech detection signals supplied by the speech detector 802.

Packet selecting means 820 receives the packets 840 from the packet assemblers 804 in the encoding means 800a, 800b, --- along with a priority signal 330 supplied from the priority signal producing means 240 and information on the number of packets in an FIFO memory (queue) 821 and selects packets to be transmitted on the basis of the capacity of the transmission line T, which are outputted from the memory 821 to the transmission line T.

On the other hand, packets received through the transmission line T are once accommodated in an FIFO memory (queue) 831 and distributed by packet distributing means 830 to packet disassemblers 813 for the respective trunks in accordance with the addresses of the destination included in the packets.

The packet disassembler 813 disassembles the distributed packet, verifies that sequence numbers are arranged in a predetermined order, and outputs speech information separated from the packet to a PCM decoder 812 with a timing specified by a time stamp. When there exists no speech information to be outputted, speech information corresponding to silence is outputted. Each of the PCM decoders 812 expands logarithmically compressed PCM signals and outputs them to a D/A converter 811. The D/A converter 811 outputs them to each of telephone sets 1 after having converted the digital signals into analogue signals.

FIG. 9 is a diagram illustrating a structure of the header generator 850 indicated in FIG. 8.

The header generator 850 includes a counter 851, a counter 852 and a destination address register 853. At first, the destination address register 853 stores the destination address of the packet reception supplied by a call controller not indicated in the figure at call establishment. Further, there are provided two counters, whose clock input is a frame clock signal $\phi_{fr}$. The speech detection signal 220 is inputted to the counter 851 as a count enable signal (terminal CE). The counter 851 is in the count enable state only at a talk-spurt and outputs sequence numbers indicating serial numbers of packets transmitted by a particular trunk. On the other hand, a time stamp indicating the point of time, where the packet is generated, is outputted by the counter 852, which is always in the count enable state.

FIG. 10 indicates an example of the format of the packet 840 outputted by the packet assembler indicated in FIG. 8.

In the packet 840, a destination address AD, a sequence number SQ and a time stamp TS supplied by the header generator 850 are arranged at the head and following them, speech information 806 supplied by the PCM coder 803 is arranged.

The speech packets thus obtained are supplied to the packet selecting means 820 indicated in FIG. 8 and in this way the packet selecting means 820 selects packets supplied to the FIFO memory (queue) on the basis of the priority signal 330 supplied by the priority signal producing means 240. Here, the priority signal producing means 240 may be the same as indicated in FIG. 2. However, here, a packet selection signal 860 indicating whether the packet outputted by the particular trunk is selected or not is supplied thereto as the assignment signal.

Figure 11:
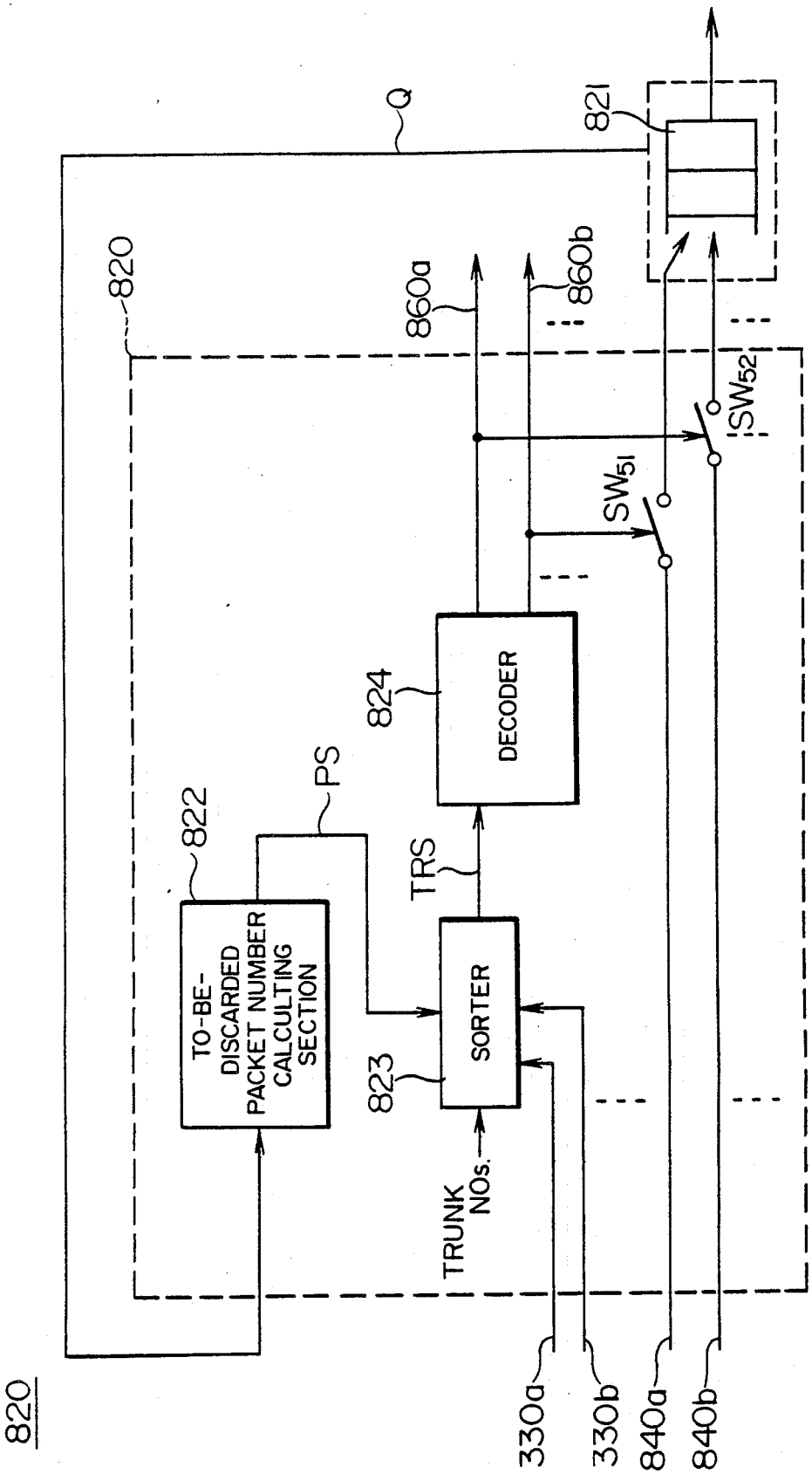
FIG. 11 is a diagram indicating an example of a structure of the packet selecting means in FIG. 8.

FIG. 11 is a diagram illustrating a structure of the packet selecting means 820 indicated in FIG. 8.

The packet selecting means 820 includes a to-be-discarded packet number calculating section 822, a decreasing-order sorting section 823 and a decoder 824. At first, the to-be-discarded packet number calculating section 822 produces a selected packet number signal PS, responding to a signal Q indicative of the number of packets within the memory 821 supplied from the FIFO memory (queue) 821. For example, in the case where there exists a number of packets within the FIFO memory (queue) 821 and it is feared that buffer overflow takes place, the number of packets to be selected is reduced and contrarily thereto, in the case where there exists almost no packets within the FIFO memory (queue) 821, the number of packets to be selected is increased. The sorting section 823 outputs trunk number signals TRS in decreasing order of the magnitudes of the weighted priority signals 330a, 330b, ---. That is, it outputs the trunk number signals TRS including information on the trunk numbers arranged in the decreasing order of the value of weighted priority signals 330 with weight determined according to the statistical data to the decoder 824. However, the number of the trunk numbers included in the outputted trunk number signal varies, depending on the selection packet signal PS described above. The decoder 824 outputs packets of the corresponding trunks to the FIFO memory (queue) 821, responding to the trunk number signal TRS described above. The packets stored in the FIFO memory (queue) are transmitted one after another to the transmission line.

In this way, in the embodiment indicated in FIG. 8, when talk-spurt signals are concentrated and the number of packets within the FIFO memory (queue) is increased so that it is feared that buffer overflow may take place in a speech packet communication system, it is possible to discard packets in an effort to delete only those having small influences on the speech sound quality and thus to control the number of packets within the FIFO memory (queue) to minimize degradation of the speech sound quality.

We claim:

1. A system for multiplexing digital speech signals produced from analog speech signals inputted from a plurality of terminals, each of said digital speech signals including a plurality of speech unit signals, the system comprising:
   means for producing a weighted priority signal for the speech unit signal of each of said speech signals from said terminals, each speech signal occupying one transmission channel;
   means responsive to said priority signals for producing an assignment signal indicative of which of said speech unit signals is to be selected for transmission in the form of a train of multiplexed speech unit signals in a cyclic transmission period of time; and
   means for receiving said speech unit signals and said assignment signal for multiplexing said speech unit signals on the basis of said assignment signal.

2. A system according to claim 1, in which said priority signal producing means includes a plurality of priority signal producing sections one provided for each of said terminals, each of said priority signal producing sections having a plurality of memories for storing statistical data with respect to speech unit signals previously applied to the priority signal producing section, a plurality of weighting circuits one provided for each of said memories so that the outputs of said memories are weighted by their associated weighting circuits and an adder for adding the weighted outputs of said memories to produce a weighted priority signal.

3. A system according to claim 1, in which said assignment signal producing means includes a comparator for sorting said weighted priority signals in terms of their magnitudes and a limiter for setting a predetermined number for transmission channels and selecting said predetermined number of priority signals taken in the order of their magnitudes among said sorted priority signals to produce said assignment signal indicating that said selected priority signals are valid and the other priority signals are invalid.

4. A system according to claim 3, in which said multiplexing means includes means responsive to said assignment signal for producing a transmission discrimination signal representative of said valid priority signals, first switch means arranged to receive said speech unit signals and for multiplexing them under control of said transmission discrimination signal to produce a train of speech unit signals of said predetermined number of transmission channels, and second switch means arranged to receive said assignment signal and deliver it for transmission along with said train of speech unit signals.

5. A system according to claim 3, in which said multiplexing means includes switch means arranged to receive said speech unit signals and for multiplexing them under control of said assignment signal to produce a train of speech unit signals of said predetermined number of transmission channels.

6. A system according to claim 1, in which said speech unit signal is a frame of speech.

7. A method of multiplexing speech signals delivered from a plurality of terminals comprising:
   converting said speech signals to digital speech signals each including a plurality of speech unit signals;
   storing statistical data with respect to previously applied speech unit signals for each of said digital speech signals;
   weighting said statistical data for the speech unit signal of each of said digital speech signals and producing from the weighted statistical data a weighted priority signal for the speech unit signal of each of said speech signals from said terminals;
   producing an assignment signal on the basis of said priority signals, said assignment signal being indicative of which of said speech unit signals is to be selected for transmission in the form of a train of multiplexed speech unit signals in a cyclic transmission period of time; and
   multiplexing said speech unit signals on the basis of said assignment signal.

8. A method according to claim 7, in which said statistical data for the speech unit signal of each of said digital speech signals includes a data concerning a mean value of powers of said previously applied speech unit signals.

9. A method according to claim 7, in which said statistical data for the speech unit signal of each of said digital speech signals includes a data concerning those previously applied speech unit signals representative of talk-spurts which were not selected for transmission.

10. A method according to claim 7, in which said statistical data for the speech unit signal of each of said digital speech signals includes a data concerning those speech unit signals representative of talk-spurts which have been sequentially applied up to an instant of the multiplexing.

11. A system for demultiplexing a multiplexed speech signal transmitted over a single transmission line and containing a sync signal, an assignment signal and a train of speech unit signals, the system comprising:
   means for extracting, from said multiplexed speech signal, a sync signal, an assignment signal and a train of speech unit signals;
   means connected with said extracting means for discriminating said sync signal to determine whether the multiplexed speech signal is correct or not, and for generating an error signal, upon determination that the signal is not correct and is not to be received;
   means connected with said extracting means for producing from said assignment signal a speech channel discriminations signal; and
   means connected with said extracting means and with said speech channel discrimination signal producing means for separating said train of speech unit signals into individual speech unit signals under control of said speech channel discriminations signal.

* * * * *